US006619318B2

(12) United States Patent
Dalhart et al.

(10) Patent No.: US 6,619,318 B2
(45) Date of Patent: Sep. 16, 2003

(54) MULTIPLE FLOW RATE EDUCTIVE DISPENSER

(75) Inventors: Mark D. Dalhart, Mason, OH (US); William F. Sand, Cincinnati, OH (US)

(73) Assignee: Hydro Systems Company, Cincinnati, OH (US)

( * ) Notice: Subject to any disclaimer, the term of this patent is extended or adjusted under 35 U.S.C. 154(b) by 101 days.

(21) Appl. No.: 09/962,506

(22) Filed: Sep. 25, 2001

(65) Prior Publication Data

US 2003/0056841 A1 Mar. 27, 2003

(51) Int. Cl.[7] .................................................. F04F 5/00
(52) U.S. Cl. ............................ 137/565.34; 137/565.22; 137/599.12; 222/571; 417/46; 417/181
(58) Field of Search ................... 137/565.22, 565.34, 137/599.03, 599.12; 222/571; 417/46, 181

(56) References Cited

U.S. PATENT DOCUMENTS

| 2,881,800 A | * | 4/1959 | Bauerlein .................... 137/892 |
| 3,567,129 A | * | 3/1971 | Martin ......................... 239/318 |
| 5,544,810 A | * | 8/1996 | Horvath et al. ................ 239/10 |
| 5,653,261 A | * | 8/1997 | Dalhart et al. .............. 137/893 |
| 5,950,924 A | * | 9/1999 | Hatakeyama et al. ........ 239/119 |

* cited by examiner

Primary Examiner—Stephen M. Hepperle
(74) Attorney, Agent, or Firm—Wood, Herron & Evans LLP

(57) ABSTRACT

A dispenser for dispensing at two flow rates eductively draws a chemical fluid such as a concentrated cleaning solution for diluting with a motive fluid such as water. Using eduction rather than gravity feed provides a consistent dilution ratio over a range of pressures of the motive fluid. A chemical reservoir contains the chemical fluid and a bottle insert assembly for interfacing to the dispenser. The bottle insert assembly seals an opening to the reservoir when the reservoir is not inserted in the dispenser, preventing leaks. Also, the bottle insert assembly includes dual pickup tubes, each with a purge accumulator, to allow dual rate flow at the same or different dilution ratios as well as drawing back unused chemical fluids from the dispenser to avoid carry-over or contamination.

19 Claims, 10 Drawing Sheets

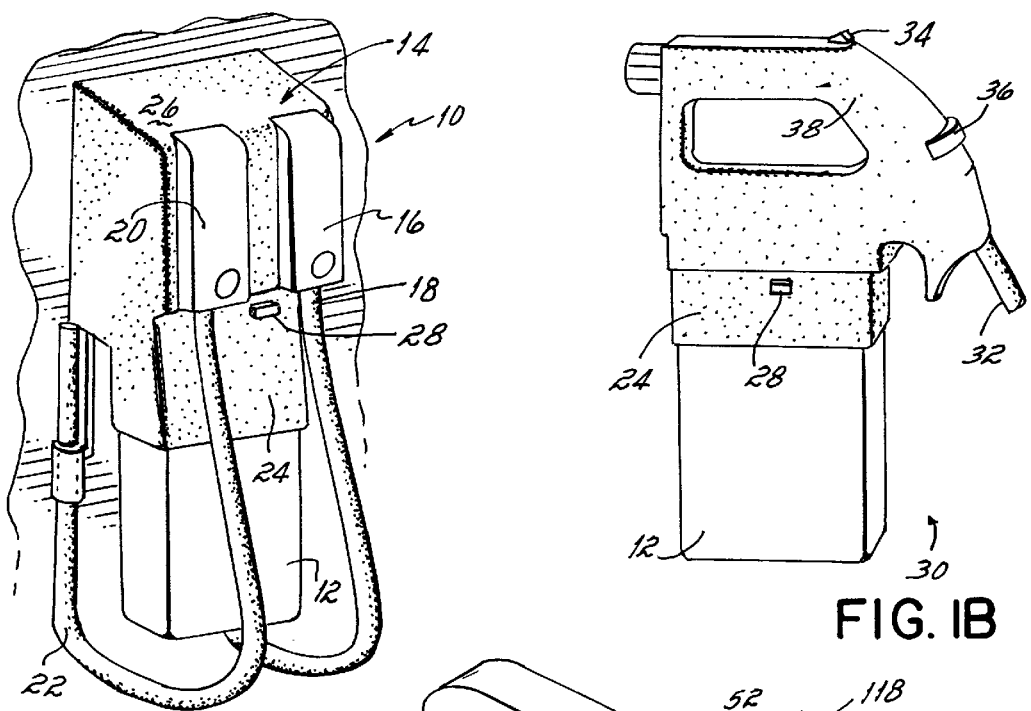
FIG. 1A
FIG. 1B
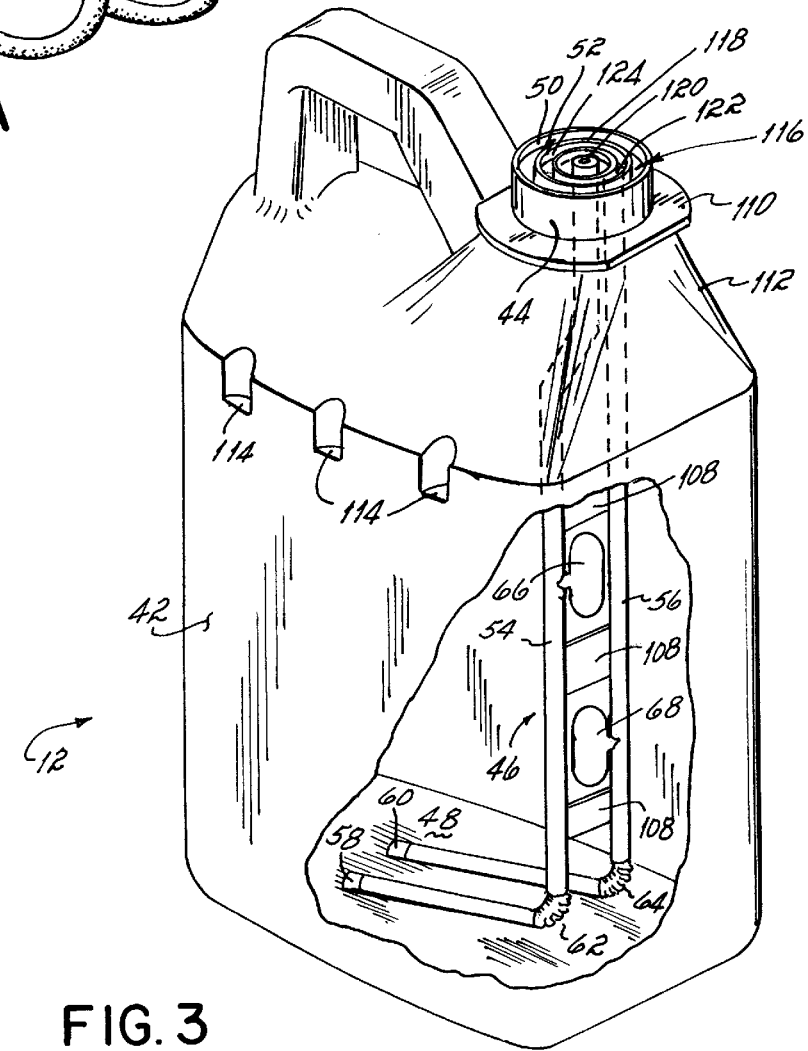
FIG. 3

MULTIPLE FLOW RATE EDUCTIVE DISPENSER

CROSS REFERENCE TO PENDING APPLICATIONS

The present application is related to the co-pending and commonly owned U.S. Ser. No. 09/962,507 entitled "MULTIPLE CHEMICAL PRODUCT EDUCTIVE DISPENSER," filed on even date herewith by William F. Sand and Mark D. Dalhart, and which is hereby incorporated by reference herein in its entirety.

BACKGROUND OF THE INVENTION

1. Field of the Invention

This invention relates to dispensers and more particularly to a chemical product venturi eductor device for selectively dispensing and mixing two fluids at a dilution ratio and a selected total fluid flow rate.

2. Prior Art

Custodial staff store cleaning supplies in a custodial closet. For example, chemical fluids such as cleaning solutions are typically stored in concentrated form in a disposable container. The custodial worker mixes the concentrated cleaning solution with water in a spray bottle or mop bucket to the desired strength (i.e., dilution ratio).

Pouring the concentrated cleaning solution directly from the disposable container into the end use container (e.g., spray bottle, mop bucket) creates problems. For example, human error results in an incorrect dilution ratio. An overly dilute cleaning solution does not clean and sanitize as desired. An overly concentrated cleaning solution may waste cleaning solution or damage property.

Consequently, dispensers are known for controlling the dispensing of cleaning solutions at a desired dilution ratio. Moreover, these known dispensers will fill at a flow rate appropriate to the size of the end use container. For instance, about one gallon per minute flow rate is appropriate for a spray bottle whereas about three or four gallons per minute is appropriate for a mop bucket.

These known dual flow rate dispensers use a gravity feed system in which the disposable container of concentrated cleaning solution is inverted. When the user selects one of the two flow rates, concentrated cleaning solution is allowed to pass through an orifice into a mixing chamber. In one system, the action of turning the disposable container mechanically turns on the water and opens the orifice to allow the mixing. In another system, the user turns on water pressure and the water pressure activates a plunger mechanism to open the orifice.

These gravity feed systems have a number of shortcomings. For example, the disposable container is inverted, and thus tends to leak if not properly installed or if the gravity feed system fails to seal properly. As another example, the dilution ratio is adversely affected by water pressure. Typical water pressure often varies from 20–80 pounds per square (psi), with low pressure 20–30 common in certain countries or remote facilities. As the water pressure varies, the dilution ratio varies, since the amount of concentrated cleaning solution that is mixed is based on gravity and the size of the orifice. The low pressure is particularly difficult for mechanism designed to open the orifice at a higher water pressure, causing even more dilute mixtures if the mechanism fails to open fully or quickly. As yet a further example, the mechanisms for opening the orifice, either by mechanical twisting or activating water pressure, are more complicated than desired for reliable operation and ease of manufacturing. As yet an additional example, the same dispenser is often used to dispense different types of chemical fluids. Thus, residual chemical fluid from previous dispensing typically has to be rinsed from the gravity feed system. This additional step is inconvenient and presents an opportunity for human error.

Consequently, a significant need exists for a dual flow dispenser that achieves a consistent dilution ratio across a range of water pressures and that does not tend to leak concentrated cleaning solutions.

SUMMARY OF THE INVENTION

In accordance with principles of the present invention, this need is met by eductively drawing a chemical fluid such as concentrated cleaning solution from an upright container, avoiding leaking by having unused chemical fluid return to the container. Moreover, the suction created by a venturi of an eductor varies with the water pressure. Consequently, the dilution ratio of an eductive dispenser varies less with water pressure than a gravity feed system. Thereby, an optimum dilution ratio is achieved, avoiding an ineffective, overly dilute mixture and avoiding a wasteful overly concentrated mixture. A preferred embodiment of the invention includes a system having an upright reservoir serviced by eductively drawn dual concentrate pickup tubes, facilitating differential rate dispensing that is more consistent than prior gravity fed systems, and with purge accumulators retrieving all unused chemical fluid in delivery passages of the dispenser back to the reservoir, thus preventing chemical carryover or contamination between dispensing applications.

Consistent with one aspect of the invention, a method provides mixing in an eductor a chemical fluid stored in a reservoir with a motive fluid by drawing the chemical fluid being drawn through a conduit from the reservoir into a venturi of the eductor. A pickup tube is contained in the chemical reservoir and includes an integral purge accumulator. Thus, when motive fluid is directed to the eductor, a suction is created at the venturi of the eductor. In response to the suction at the venturi, the chemical fluid is drawn from the reservoir via the pickup tube and conduit, thereby resiliently collapsing the purge accumulator. When the motive fluid is terminated, the conduit is simultaneously vented near the venturi, thereby allowing the purge accumulator to resiliently expand to withdraw chemical fluid from the conduit back into the environment of the reservoir. Consequently, another reservoir having another type of chemical fluid may be inserted without leaving residual chemical fluid in the dispenser.

Consistent with another aspect of the invention, a detachable reservoir is configured for a dispenser that eductively dilutes and dispenses a chemical fluid at two flow rates. The reservoir includes two pickup tubes that communicate between an opening of a bottle and a lower portion of the bottle. By having two pickup tubes, portions of the eductive dilution dispenser may be duplicated so that a specific dilution ratio and two total flow rates may be imposed for each path beginning at each pickup tube.

Consistent with an additional aspect of the invention, a dispenser dispenses at a consistent dilution ratio and at two flow rates by having dual eductors, each eductively drawing the chemical fluid from the reservoir through a respective pair of a conduit and a pickup tube. A control selectively directs motive fluid to the first and second eductors to dispense. The control also selectively blocks motive fluid to the first and second eductors while venting the corresponding conduit to facilitate withdrawing chemical fluid from the conduit without withdrawing mixed fluids from the eductor.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 1A is a perspective view of a Stationary Multiple Product (SMP) version of a dispenser consistent with the present invention;

FIG. 1B is a perspective view of a Mobile Multiple Product (MMP) version of a dispenser consistent with the present invention;

FIG. 3 is a perspective of a reservoir assembly of the dispensers of FIGS. 1A, 1B, and 2;

DETAILED DESCRIPTION OF SPECIFIC EMBODIMENTS

Figure 2:
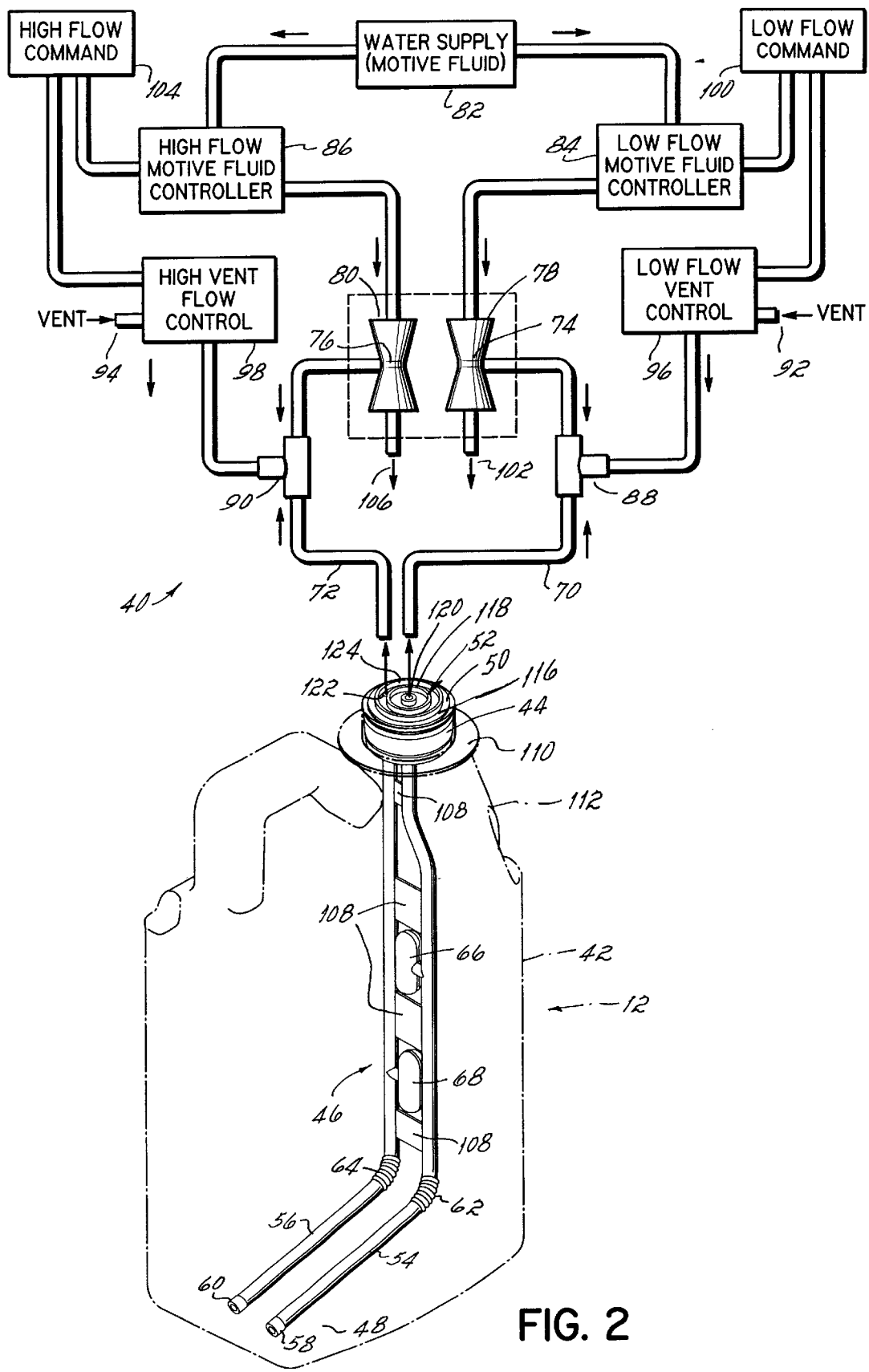
FIG. 2 is a functional schematic diagram of a dual flow rate eductor system of the dispensers of FIGS. 1A–1B.

Turning to the Drawings, wherein like numbers denote like parts throughout the several views, FIG. 1A depicts a dispenser 10 for diluting and dispensing a chemical fluid contained in a reservoir 12 at one of two flow rates. In particular, the dispenser is configured as a Stationary Multiple Product (SMP) dispenser 14, intended for mounting to wall. A low flow control 16 causes dispensing at approximately one gallon per minute rate through a short outlet spout 18 for filling spray bottles and other small containers. A high flow rate 20 control 20 causes dispensing at approximately 3.5 gallons per minute through a long outlet hose 22 for filling mop buckets and other large containers that are typically placed on the floor during filling. A shroud 24 beneath a cabinet 26 of the SMP dispenser 14 encompasses and selectively grips the reservoir 12 until released by a reservoir release lever 28.

FIG. 1B depicts a dispenser 10 configured as a Mobile Multiple Product (MMP) dispenser 30, intended to be hand carried and positioned to fill end user containers (e.g., spray bottle, mop bucket) from a single outlet spout 32. Rather than having independent controls for each flow rate, the MMP dispenser 30 uses a water control lever 34 and a flow rate selector control lever 36. Thus, the MMP dispenser 30 dispenses at the selected flow rate (low, high) as set by the flow rate selector control lever 36 when the water control lever 34 is turned on. The same shroud 24 incorporated in the SMP dispenser 14 is used to grip the reservoir 12 until released by the reservoir release lever 28. The shroud 24 mounts beneath a handle assembly 38.

With reference to FIG. 2, a dual flow rate eductor system 40 of the dispenser 10 of FIGS. 1A–1B is functionally depicted. The reservoir 12 that contains the chemical fluid, such as concentrated cleaning solution, is shown as including a bottle 42 having a generally cylindrical, neck opening 44 and a bottle insert assembly 46 that seals the neck opening 44 and draws the chemical fluid from a lower portion or bottom 48 of the bottle 42. In particular, an interior diameter 50 of the neck opening 44 of the bottle 42 holds and seals to a cylindrical cartridge 52 of the bottle insert assembly 46. Specifically, an interference fit is formed by a narrowed inner diameter at an entrance and exit of the neck opening 44, forming a secure attachment and seal to the cartridge 52 after insertion.

The remaining vessel portion of the bottle 42 is configured to store a quantity of chemical fluid that is eductively drawn by the bottle insert assembly 46. To this end, the bottle insert assembly 46 includes low and high flow rate pickup tubes 54, 56 that communicate between the bottom 48 of the bottle 42 and the cartridge 52. Each pickup tube 54, 56 has a metering tip 58, 60 having an orifice (not shown) sized for the desired dilution ratio for each flow rate. A bellows 62, 64, respectively, in each pickup tube 54, 56, in cooperation with the length of the pickup tubes exceeding the height of the bottle 42, maintain metering tips 54, 56 at the bottom 48 to not waste chemical fluid as well as accommodating variations in the height of the bottle 42. Each pickup tube 54, 56 also includes a purge accumulator 66, 68. Each purge accumulator 66, 68 is sized by volume and wall thickness to collapse when chemical fluid is eductively drawn through the pickup tube 54, 56 and to resiliently expand thereafter. By contrast, the pickup tubes are provided with a wall thickness sufficient to avoid collapsing.

The cartridge 52 couples the pickup tubes 54, 56 to low and high flow rate conduits 70, 72, respectively. The conduits 70, 72 in turn communicate with a respective venturi 74, 76 of low and high flow rate eductors 78, 80. The eductors 78, 80 receive motive fluid, such as pressurized water, from a water supply 82 that is directed by a respective low and high flow motive fluid controller 84, 86. Near each venturi 74, 76, a T-connection 88, 90 in each conduit 70, 72 is selectively coupled to a vent 92, 94 by a low and high 20 flow vent controller 96, 98, respectively.

In operation, the dual flow rate eductor system 40 is initially not dispensing, with motive fluid blocked or terminated by low and high flow motive fluid controllers 84, 86 and both vent controllers 96, 98 opened, venting conduits 70, 72. When a low flow command 100 is provided to the eductor system 40 by a user, low flow motive fluid controller 84 is opened, allowing motive fluid to enter the low flow eductor 78. The low flow command 100 also closes the low flow vent controller 96 so that the low flow conduit 70 only communicates between the venturi 74 of the low flow eductor 78 and the reservoir 12. In response to the resultant suction at the venturi 74, chemical fluid is drawn through the metering tip 58 at the bottom 48 of the bottle 42 into the low flow pickup tube 54. The suction also causes the purge accumulator 66 to collapse. When the chemical fluid reaches the venturi 74, the chemical fluid is mixed with the motive fluid achieving the desired dilution ratio in a mixed fluid output 102 that is dispensed at a total flow rate of approximately one gallon per minute. As chemical fluid exits the reservoir, air is allowed to replace the lost volume in the bottle 42 by way of the vent 94, through high flow vent controller 98, T-connection 90, high flow conduit 72, high flow pickup tube 56, and metering tip 60.

When the low flow command 100 is terminated, the low flow motive fluid controller 84 closes, terminating motive fluid to the low flow eductor 78. Any remaining mixed fluid in the eductor 78 passes on through to become mixed fluid output 102. Low flow vent controller 96 also opens, venting the low flow conduit 70 near the venturi 74, assisting the remaining mixed fluid in the eductor 78 to exit. In addition, air from the vent 92 that passes through the T-connection 88 also prevents mixed fluid from being drawn back into the conduit 70 by the such from the purge accumulator 66 when expanding. The purge accumulator 66, sized for the volume of the conduit 70, expands when the low flow command 100 is terminated, drawing the chemical fluid back into the bottle 42 from the conduit 70. Thus, another reservoir 12 may be installed that contains another chemical fluid without having to rinse residual or carryover fluid from the eductor system 40.

The metering tips 58, 60 advantageously assist in draining conduit 70. First, the conduit 70 has a gravity advantage over chemical fluid being drawn into metering tip 58 by the expanding purge accumulator 66. In addition, the low flow vent controller 96 allows air to enter more easily to the conduit 70 than the metering tip 58 allows chemical fluid to enter the low flow pickup tube 54. Typically, the bottle 12 is under a slight vacuum during dispensing since the high flow metering tip 60 slows the air that is replenishing the volume of the bottle 42 while the low flow pickup tube 54 is dispensing chemical fluid.

The components of the dual flow rate eductor system 40 operate in like manner when a high flow command 104 is made by the user to dispense a mixed fluid output 106 at about 3.5 gallons per minute, with the role of the low flow components interchanged for the role of the high flow components.

With reference to FIG. 3, the reservoir 12 is depicted in perspective view to show lateral connections 108 between the pickup tubes 54–56 that structurally support the bottle insert assembly 46. Also, the bottle 42 includes an engagement member for selectively attaching or locking the reservoir 12 to the dispenser 10. In the illustrative embodiment, the bottle 42 includes an engagement member depicted as flange 110 circumferentially extending from the neck opening 44 and used to lock the reservoir 12 to the shroud 24 as discussed below. The engagement member further includes provisions for preventing attachment in some instances. In particular, an upper portion 112 of the bottle 42 advantageously includes upwardly opened lockout recesses 114 that interact with the shroud 24. As will be discussed below, the absence of a required lockout recess 114 prevents attachment of a bottle 42 containing an undesired chemical fluid.

Figure 5:
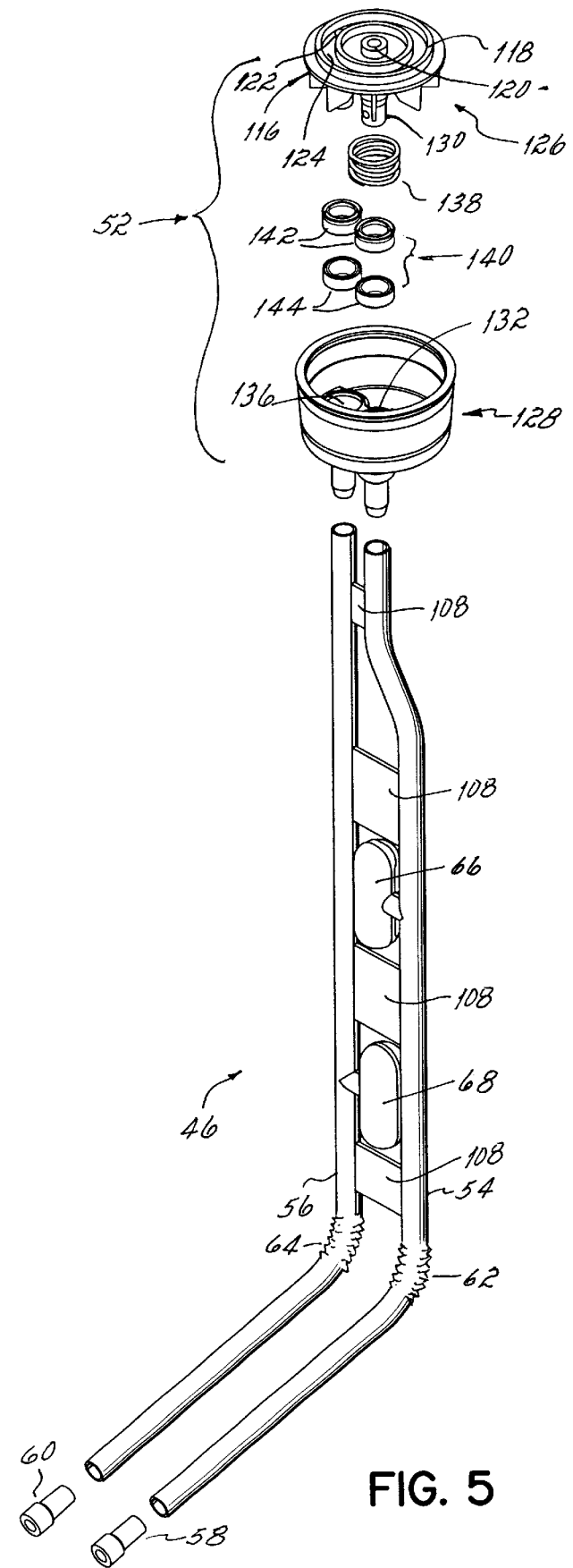
FIG. 5 is an exploded, perspective view of a bottle insert assembly of the reservoir assembly of FIGS. 3–4.
Figure 6A:
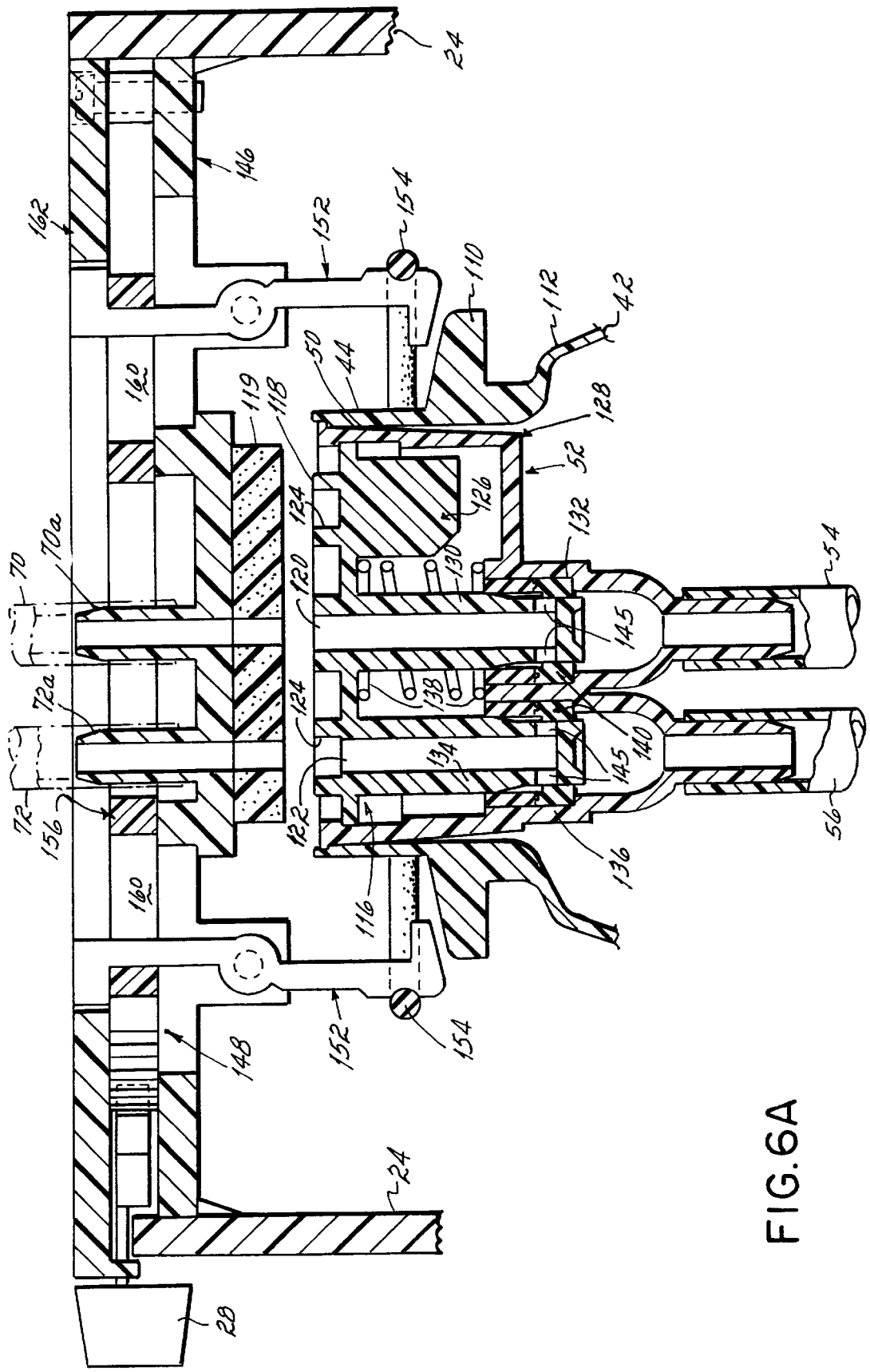
FIG. 6A is a cross-sectional view of the bottle insert assembly in an extended, opened position, shown along line 6B—6B the reservoir assembly of FIG. 4.
Figure 6B:
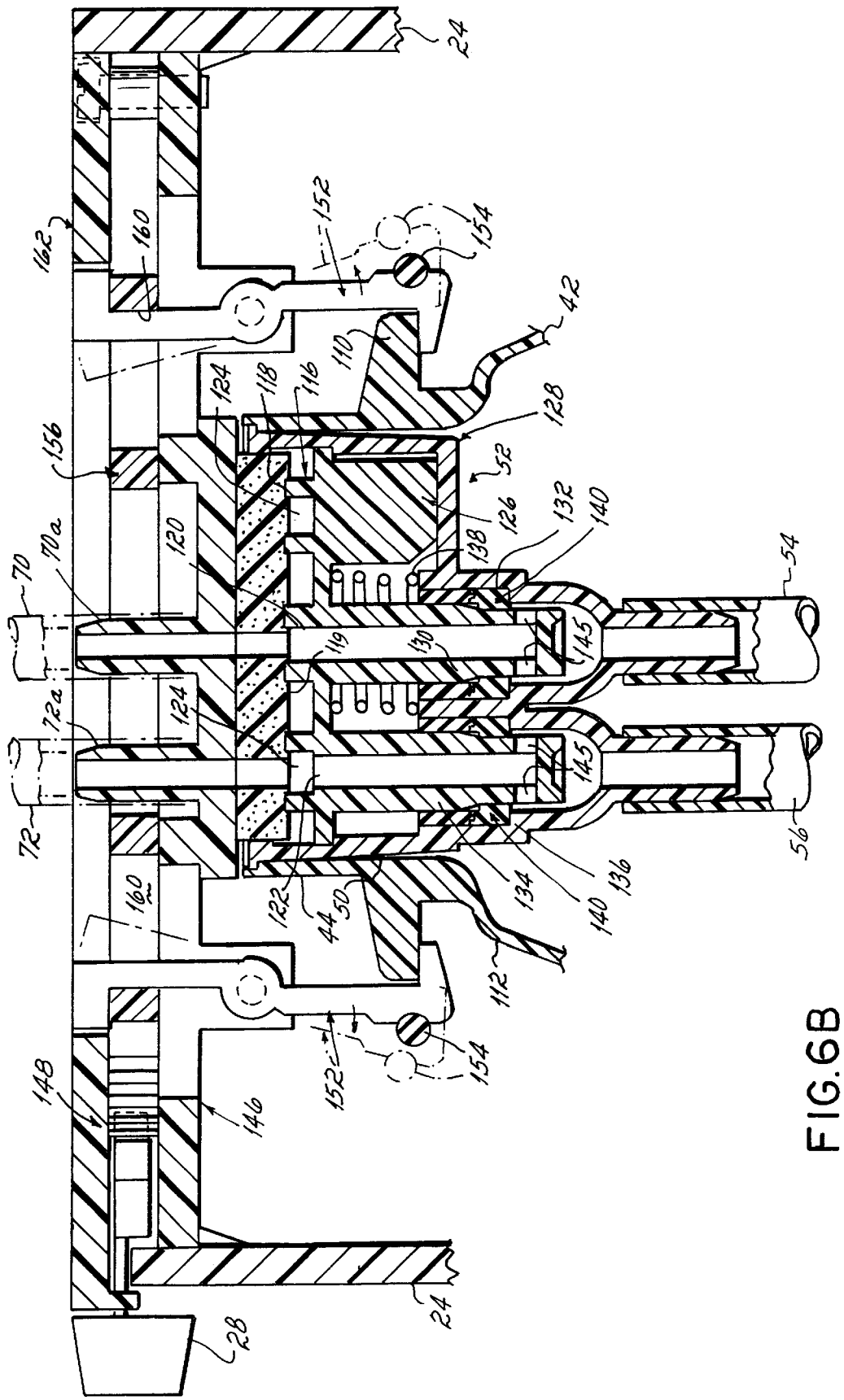
FIG. 6B is a cross-sectional view of the bottle insert assembly in a compressed, closed position, shown along line 6B—6B the reservoir assembly of FIG. 4.

With reference to FIGS. 5, 6A and 6B, the upper portion 112 of the reservoir 12 is shown from above, illustrating the lockout recesses 114 and a rotatable interface 116 of the bottle insert assembly 46. In particular, an upper surface 118 of the cartridge 52, for abutting against a sealing member 119 of the shroud 24, includes a centered low pressure orifice 120 that communicates with the low flow rate pickup tube 54 inside the bottle 42. The upper surface 118 also includes a radially offset high pressure orifice 122 that communicates with a centered, circular channel 124. Thus, the high pressure orifice 122 is accessed about the channel 124, allowing the cartridge 52 to be inserted at various angles and to still communicate with the conduits 70, 72. The high pressure orifice is selected for being radially offset, with a corresponding increase in fluid volume to communicate with an angularly offset conduit 72, since at higher flow rates the increased fluid volume is less significant.

With reference to FIG. 5, the bottle insert assembly 46 is depicted unassembled, revealing components of the cartridge 52. In particular, the cartridge 52 includes an inner housing 126, which includes the upper surface 118, and an outer housing 128. The inner housing 126 includes a low flow rate poppet 130 that is received in a low flow rate annular seat 132 of the outer housing 128. The inner housing 126 also includes a high flow rate poppet 134 that is received in a high flow rate annular seat 136 of the outer housing 128. A compression spring 138 is positioned between the inner and outer housings 126, 128 to upwardly expand the cartridge 52 to a sealed position when the reservoir 12 is not installed in the dispenser 10.

An annular seal assembly 140 of an upper ring seal 142 and a lower ring seal 144 is positioned within each annular seat 132, 136, respectively, to seal in a manner depicted in FIGS. 6A, 6B. With reference to FIG. 6A, the cartridge 52 is depicted in the upwardly expanded position wherein the cartridge closes or seals both orifices 120, 122 with respect to the interior of the bottle 42. Thus, the reservoir 12 does not spill when overturned. In particular, each poppet 130, 134 includes a passage 145 that passes through the horizontal diameter of the respective poppet 130, 134. Each passage 145 is aligned with the corresponding annular seal assembly 140 when in the closed position.

With reference to FIG. 6B, the cartridge 52 is shown in the downwardly compressed, open position as would be typical after being installed in the dispenser 10. The upper surface 118 of the inner housing 126 abuts and seals against the sealing member 119 of the lower surface of a frame assembly 146 of the shroud 24 that forces the inner housing 126 downward, compressing the spring 138. Each passage 145 in respective poppets 130, 134 is thereby extended into the outer housing 128 into fluid communication with the respective pickup tube 54, 56. The shroud 24 is mounted to the reservoir 12 with the frame assembly 146 that contacts the upper surface 118 to force the cartridge 52 into the open position. The frame assembly 146 also includes conduit interfaces 70a, 72a that communicate respectively between orifices 120, 122 and conduits 70, 72.

With reference to FIGS. 4, and 7–9, the shroud 24 is shown to further include a gripping mechanism 148 to selectively grip the flange 110 of the bottle 42 until released by the reservoir release lever 28. The gripping mechanism 148 includes four locking tabs 152 that are downwardly arrayed and inwardly pivoting from the frame assembly 146 to grip the flange 110, urged into contact by a circular spring, such as an O-ring 154. A bottle release cam 156, having four cam surfaces 160, inwardly urges each upper portion of the four locking tabs 152 when rotated by the reservoir release lever 28, and thus outwardly pivots the lower portions of the locking tabs 152, releasing the reservoir 12.

Figure 4:
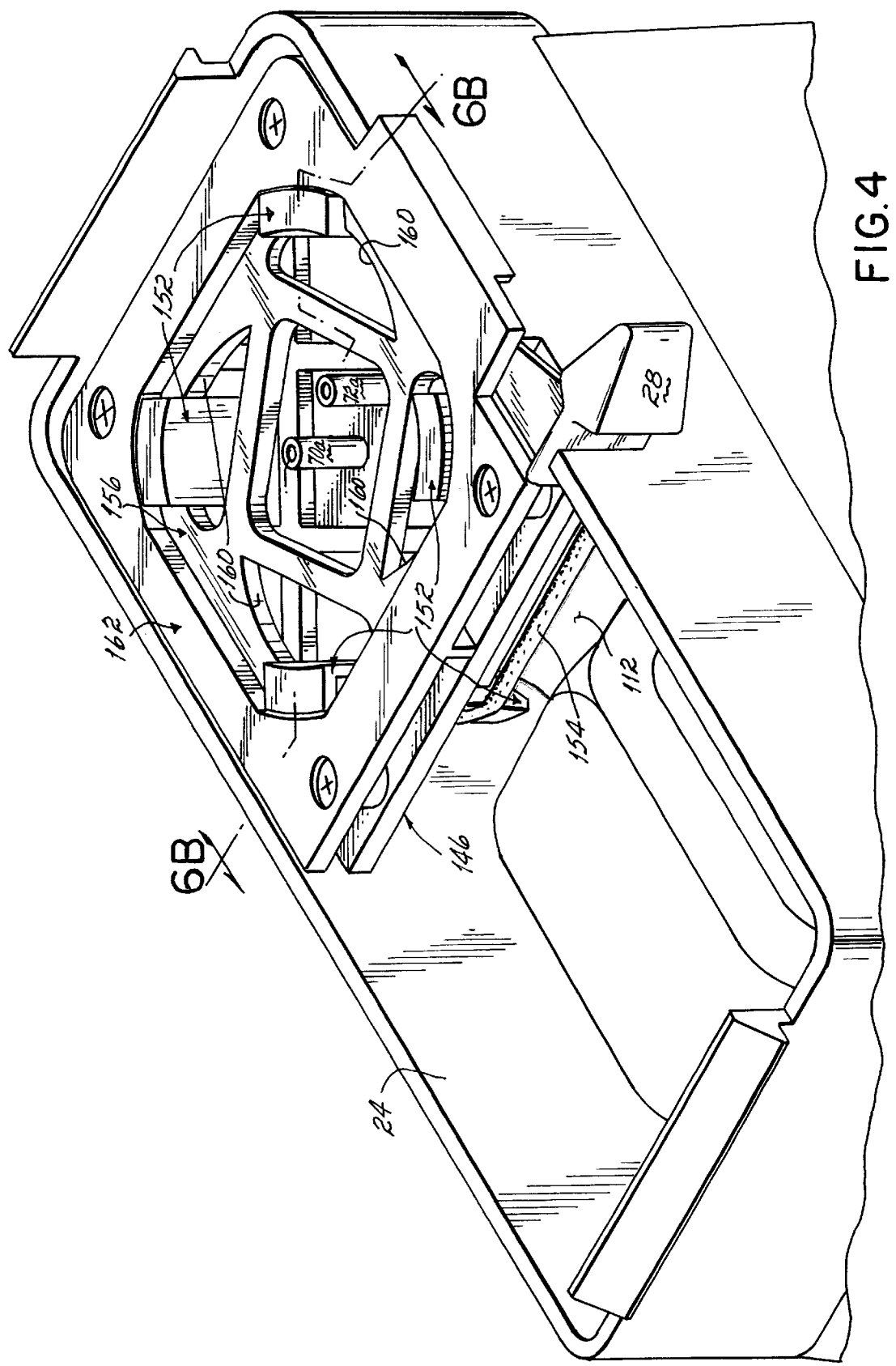
FIG. 4 is a perspective view of the reservoir assembly mounted to a shroud assembly of the dispensers of FIGS. 1A–1B.
Figure 9:
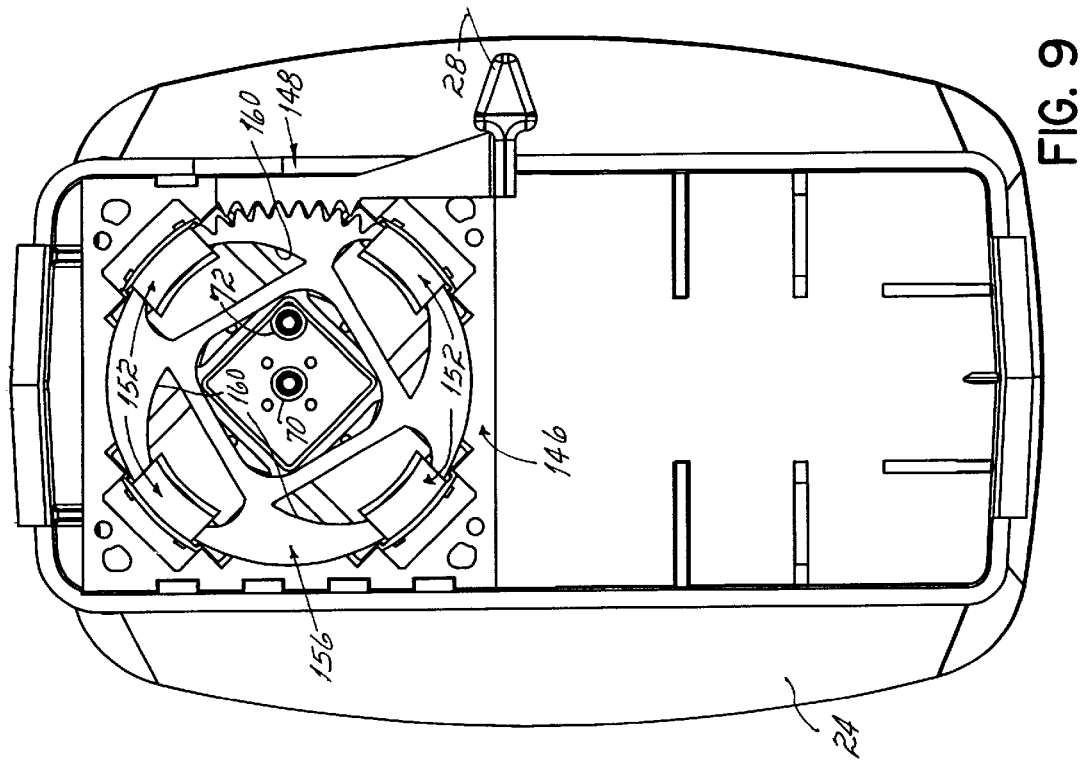
FIG. 9 is a top view of the shroud assembly of FIGS. 4–8 with a lever cover removed to expose a release cam and release cam lever.
Figure 7:
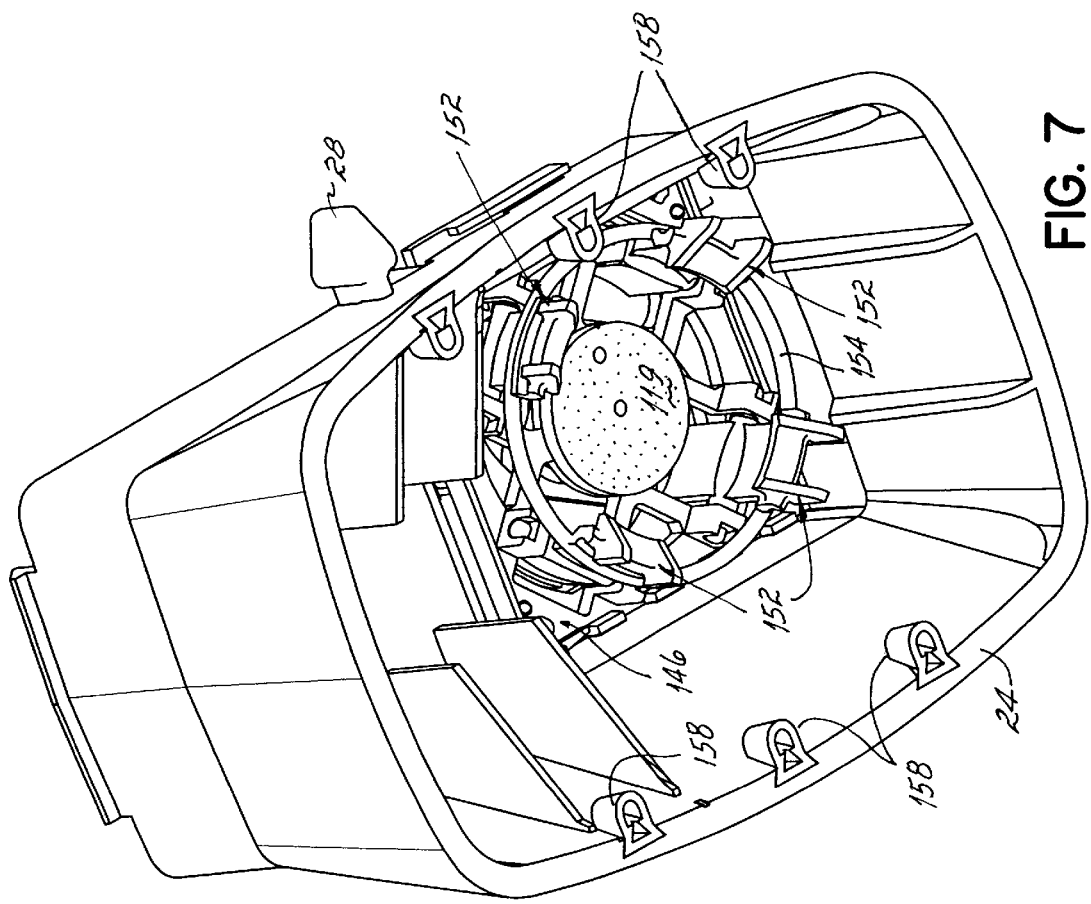
FIG. 7 is a bottom perspective view of the shroud assembly of FIG. 4.
Figure 8:
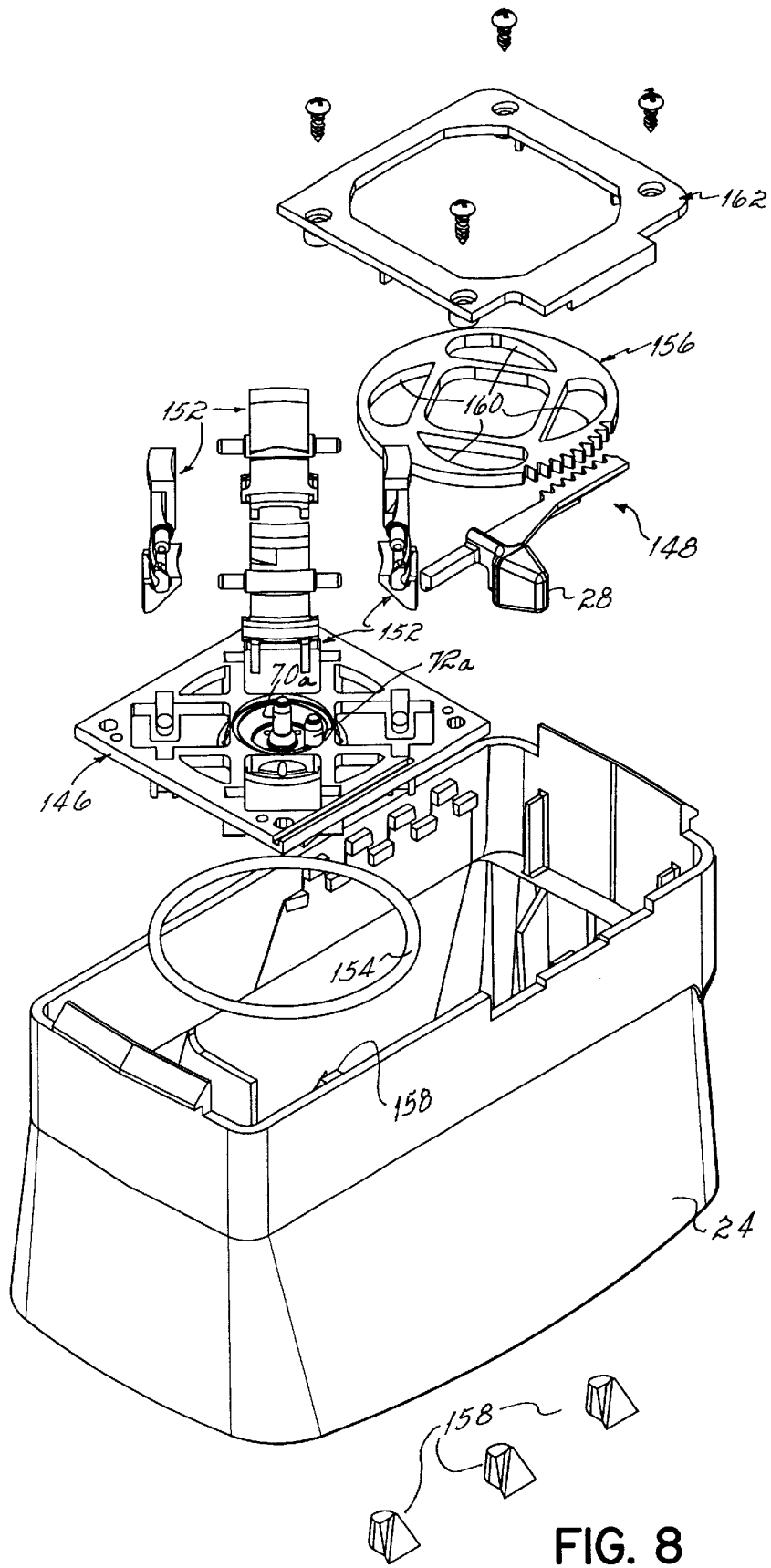
FIG. 8 is an exploded view of the shroud assembly of FIG. 7.

With particular reference to FIG. 7, a downward portion of the shroud 24 is shown to include lockout keys 158 that cooperate with the recesses 114 in the reservoir 12 to prevent an undesired type of chemical fluid from being installed in the dispenser 10. With particular reference to FIGS. 4 and 9, the arrangement of the gripping mechanism 148 is shown, with the upper portions of the locking tabs 152 outwardly contacting ramped, radially spaced openings 160 in the cam 156. A cover 162 shown above the cam 156 in FIGS. 6A, 6B and 8 positions the gripping mechanism 148 against the frame assembly 146.

Figure 10:
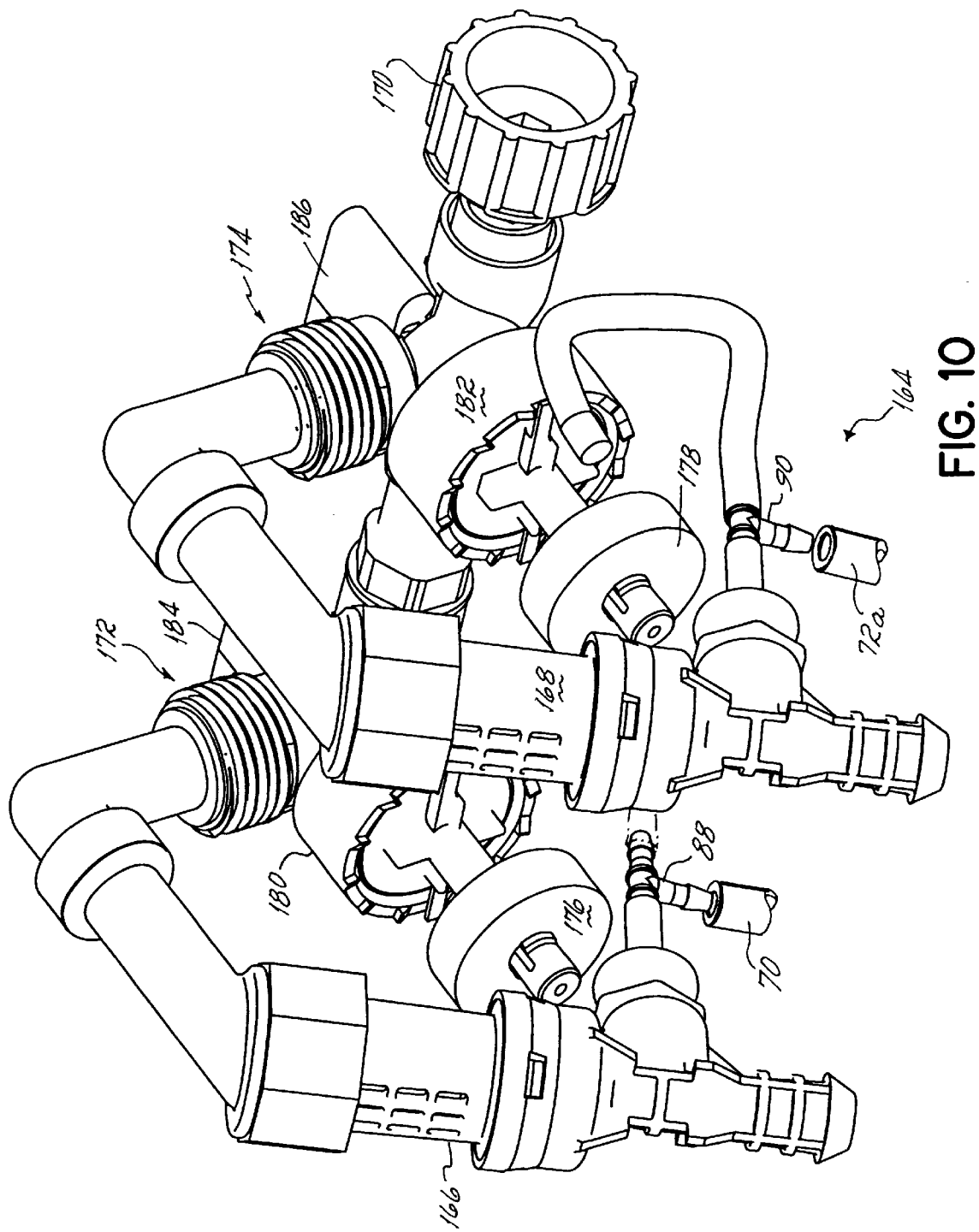
FIG. 10 is a perspective view of a dual eductor manifold assembly of the SMP dispenser of FIG. 1A.

With reference to FIG. 10, a dual eductor manifold 164 for the SMP dispenser 14 of FIG. 1A is depicted. A low flow rate eductor 166 and a high flow rate eductor 168 are depicted as separate components, each having a flow rate determined by dimensions of the eductor and flow washers internally installed (not shown). The eductors 166, 168 may advantageously include back flow protection features, such as an air gap or elastomeric backflow prevention "E-gap" eductor. A water supply connection 170 provides motive fluid to both eductors 166, 168 via respective flow controllers 172, 174 that mechanical couple a vent control valve 176, 178 to a water control valve 180, 182 in response to a flow command lever 184, 186. Thus, the flow command levers 180, 182 simultaneously close a vent to a respective T-connector 88, 90 when directing water to the eductor 166, 168.

Figure 11:
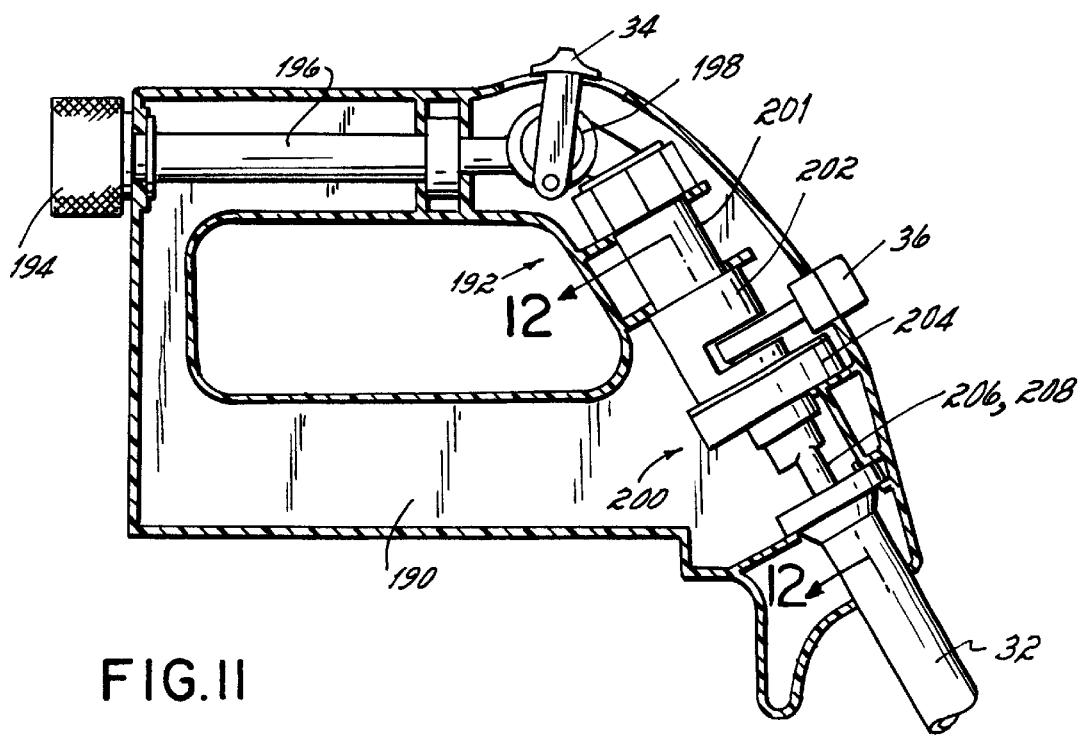
FIG. 11 is a side view of a left handle cover and a dual eductor manifold assembly of the MMP dispenser of FIG. 1B.
Figure 12:
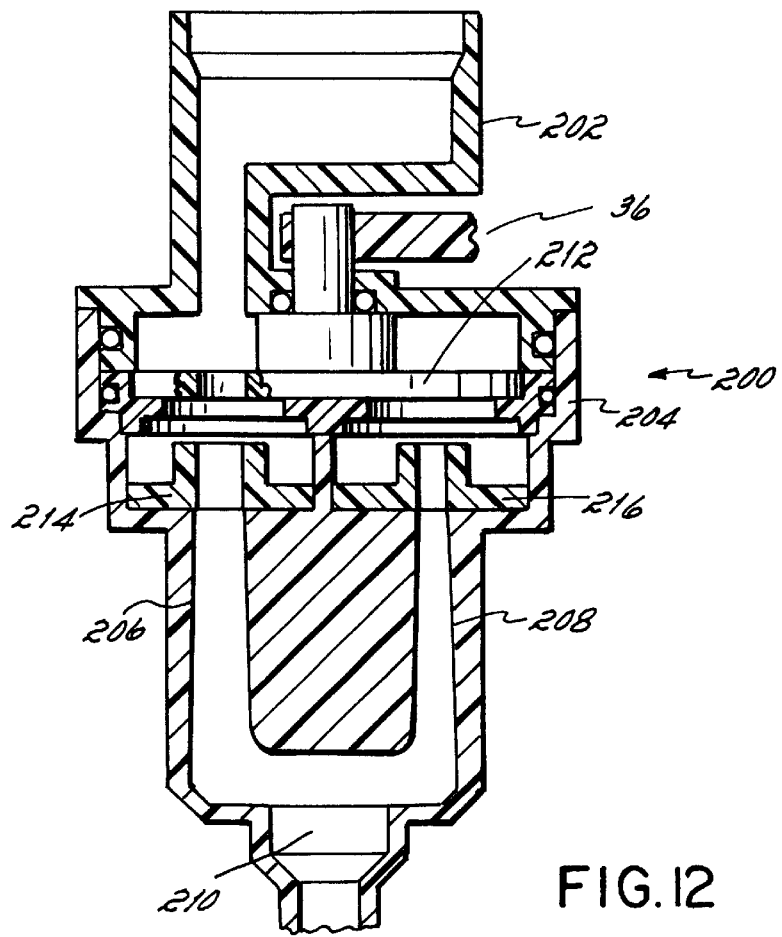
FIG. 12 is a cross sectional view of the MMP venturi assembly along line 12—12 of FIG. 11.

With reference to FIGS. 11 and 12, the handle assembly 38 of MMP dispenser 30 of FIG. 1B is shown with half of a handle cover 190 removed, exposing an MMP manifold 192. Water is supplied to a water inlet connector 194, which in turn passes through a water conduit 196 to a water control valve 198, controlled by the water control lever 34. Water then enters an eductor assembly 200 for selectively mixing with the chemical fluid and then is dispensed through single outlet spout 32. An elastomeric backflow prevention conduit 201 is advantageously placed between the water control valve 198 and the eductor assembly 200. The elastomeric backflow prevention conduit 201 operates similarly to E-gap eductors as is known to those skilled in the art.

The eductor assembly 200 is depicted as having a selector body 202, an eductor body 204 with a low flow rate eductor 206 and a high flow rate eductor 208. Both eductors 206, 208 dispense into an outlet 210 that attaches to the single outlet spout 32. The flow rate selector control lever 36 positions a selector disk 212 inside the selector body 202 that selectively diverts motive fluid to one of the eductors 206, 208. Each eductor 206, 208 is coupled to the reservoir and is vented in a fashion as described above. The difference in flow rate between the eductors 206, 208 is achieved by the dimensions of the eductors and the selection of flow washers 214, 216 inserted at between each eductor 206, 208 and the selector disk 212.

It will be appreciated that the eductor assembly 200 may advantageously be modified to select additional numbers of products and that two is for illustration purposes only. In addition, the eductor assembly 200 may be readily used in a stationary application of a dispenser 10, rather than only in a portable application.

In use, a reservoir 12 containing a chemical fluid is selected for mixing with a motive fluid such as water. The reservoir 12 is inserted into the shroud 24 of the dispenser 10, wherein a gripping mechanism 148 grips the flange 110 of the reservoir 12. When gripped, the sealing member 119 in the shroud compresses the cartridge 52 in the neck opening 44 of the bottle 42 of the reservoir 12, opening fluid passages respectively between low and high flow rate conduits 70, 72 in the dispenser 10 and low and high flow rate pickup tubes 54, 56 in the bottle 42. When motive fluid is directed to a low flow rate eductor 78, low flow rate venturi 74 draws chemical fluid through the low flow rate conduit 70 and pickup tube 54 for mixing. Vent air replenishes the bottle through the high flow rate conduit 72 and pickup tube 56. The purge accumulator 66 in the low flow rate pickup tube 54 collapses due to the suction from the venturi 74. Thus, when the motive fluid to the eductor 78 is terminated and the vent 92 opened to the conduit 70, the purge accumulator expands, drawing unmixed chemical fluid from the conduit 70 back to the reservoir 12. A similar operation occurs when the high flow rate components are selected for high flow rate dispensing.

By virtue of the foregoing, the dispenser 10 eductively dispenses at least one of two flow rates with a predetermined dilution ratio without the shortcomings of trapped chemical fluid in the dispenser, leaks from an inverted reservoir, nor undue sensitivity to motive fluid pressure.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of mixing in an eductor a chemical fluid stored in a reservoir with a motive fluid, the chemical fluid being drawn through a conduit from the reservoir into a venturi of the eductor when the motive fluid passes through the eductor, the conduit being in fluid communication with a pickup tube inside the reservoir, the pickup tube having a purge accumulator, the method comprising:

directing motive fluid to the eductor, creating a suction at the venturi of the eductor;

in response to the suction at the venturi, drawing the chemical fluid from the reservoir via the pickup tube and conduit, thereby resiliently collapsing the purge accumulator; and simultaneously terminating motive fluid to the eductor and venting the conduit near the venturi, thereby allowing the purge accumulator to resiliently expand to withdraw chemical fluid from the conduit.

2. The method of claim 1, wherein the eductor, conduit and pickup tube comprise respectively a first eductor, first conduit, and first pickup tube that combine to dispense at a first flow rate, the chemical fluid being eductively drawn through a second conduit and a second pickup tube having a second purge accumulator from the reservoir into a venturi of a second eductor to dispense at a second flow rate, the method further comprising:

directing motive fluid to the second eductor while preventing motive fluid to the first eductor and while venting the first conduit;

in response to a suction at the venturi of the second eductor, drawing the chemical fluid from the reservoir via the second pickup tube and second conduit, thereby resiliently collapsing the purge accumulator of the second pickup tube; and simultaneously terminating motive fluid to the second eductor and venting the second conduit near the venturi, thereby allowing the second purge accumulator to resiliently expand to withdraw chemical fluid from the second conduit.

3. A detachable reservoir for a dispenser that dispenses a chemical fluid drawn from the reservoir eductively diluted into a motive fluid at two flow rates, the dispenser having two conduits for drawing the chemical fluid into respective eductors, the reservoir comprising:

a bottle having an opening;

a first pickup tube in fluid communication between a lower portion of the bottle and the opening; and a second pickup tube in fluid communication between the lower portion of the bottle and the opening.

4. The reservoir of claim 3, wherein each pickup tube includes a purge accumulator having a resiliency less than a suction created in the respective pickup tube when dispensing to thereby collapse and having a volume sufficient to evacuate the corresponding conduit when dispensing is terminated.

5. The reservoir of claim 3, wherein the opening in the bottle further comprises a necked opening, the reservoir further comprising a bottle insert assembly comprising:

the first and second pickup tubes;

a cartridge sealingly received in the necked opening; and a first and second conduit orifice exteriorly disposed through the necked opening to couple to respective conduits.

6. The reservoir of claim 5, wherein the cartridge further includes a contact portion configured for resilient abutment to the dispenser when the reservoir is installed, the cartridge further configured to enable fluid communication between the first and second conduit orifices and the respective first and second pickup tubes in response to installation of the reservoir.

7. The reservoir of claim 5, wherein the cartridge further comprises:

an outer housing having two annular seats;

an inner housing having two poppets, each poppet extending toward and having a side opening sealed against a respective annular seat at a cartridge extended position, each poppet unsealed and extending further into the outer housing at a cartridge compressed position, each pair of annular seat and poppet forming a fluid passage between a respective pair of pickup tube and orifice when in the cartridge compressed position; and a spring interposed between the outer housing and dual poppet to resiliently position the cartridge in the extended position.

8. The reservoir of claim 5, wherein the necked opening and cartridge are cylindrical, one orifice centrally located and the other radially displaced, a top surface of the cartridge further including a radial channel communicating with the radially displaced orifice, thereby allowing the bottle insert assembly to be inserted at various angles.

9. The reservoir of claim 3, wherein the first and second pickup tubes have a length longer than the height of the reservoir, each pickup tube including a bellowed portion to allowing bending and to maintain a lower end of the respective pickup tube at a bottom surface of the reservoir.

10. The reservoir of claim 9, wherein the bottle insert assembly further includes a metering tip received the lower end respectively of each pickup tube for setting a dilution ratio and for preventing collapse of the lower end of the pickup tube.

11. A dispenser comprising:

a first eductor;

a second eductor;

a reservoir configured to hold a chemical fluid and comprising:

a bottle having an opening, a first pickup tube in fluid communication between a lower portion of the bottle and the opening, and a second pickup tube in fluid communication between the lower portion of the bottle and the opening;

a first conduit communicating between a venturi of the first eductor and the first pickup tube;

a second conduit communicating between a venturi of the second eductor and the second pickup tube;

a control configured to selectively direct motive fluid to one of the first and second eductors and to vent the conduit corresponding to the other of the first and second eductors.

12. The dispenser of claim 11, wherein each pickup tube includes a purge accumulator having a resiliency less than a suction created in the respective pickup tube when dispensing to thereby collapse and having a volume sufficient to evacuate the corresponding conduit when dispensing is terminated.

13. The dispenser of claim 11, further comprising a shroud to encompass an upper portion of the reservoir, the shroud including a locking mechanism to selectively grip the upper portion of the reservoir.

14. The dispenser of claim 13, wherein the shroud includes at least one lockout member registered to be received in a recess in the reservoir to prevent insertion of a reservoir containing another chemical fluid.

15. A dispenser comprising:

a means for storing a chemical fluid;

a means for operatively eductively drawing the chemical fluid from the storing means into a conduit and for discharging the chemical fluid from the conduit for mixing with a motive fluid at a first flow rate;

a means for sucking the chemical fluid from the conduit and for returning the chemical fluid to the storing means when said eductively drawing means ceases operation;

a means for operatively eductively drawing the chemical fluid from the storing means into a conduit and for discharging the chemical fluid from the conduit for mixing with a motive fluid at a second flow rate; and a means for sucking the chemical fluid, mixed at a second flow rate, from the conduit and for returning the chemical fluid to the storing means when said means for operatively eductively drawing the chemical fluid for mixing at a second flow rate ceases operation.

16. A bottle for a dispenser that dispenses a chemical fluid drawn from the reservoir eductively diluted into a motive fluid at two flow rates, the dispenser having two conduits for drawing the chemical fluid into respective eductors, a first and second pickup tube for insertion into the bottle, and a cartridge that is in fluid communication between the two conduits and the two pickup tubes, the bottle comprising:

a neck opening sized to sealingly admit the cartridge of the dispenser and including an interference fit to retain the cartridge after insertion;

a vessel portion configured to receive the two pickup tubes that extend from the cartridge and to store a quantity of the chemical fluid; and an engagement member for selective gripping by the dispenser.

17. The bottle of claim 16, wherein the engagement member comprises an outwardly projecting flange from the neck opening.

18. The bottle of claim 16, wherein the engagement member comprises at least one lockout recess for receiving a lockout key disposed on the dispenser.

19. A dispenser comprising:

a reservoir;

an eductor operatively communicating with the reservoir through a pickup tube by drawing fluid in the reservoir up into a motive fluid;

an accumulator in said pickup tube for accumulating fluid therein when the flow of motive fluid ceases.

* * * * *